United States Patent [19]

Wagner et al.

[11] Patent Number: 5,016,694
[45] Date of Patent: May 21, 1991

[54] CLAMPING ASSEMBLY

[76] Inventors: Richard L. Wagner, 2801 SW. 156 Ave., Davie, Fla. 33331; William C. Weber, 3460 SW. 19th St., Fort Lauderdale, Fla. 33312

[21] Appl. No.: 491,265

[22] Filed: Mar. 9, 1990

[51] Int. Cl.$^5$ ............................................. B27C 5/00
[52] U.S. Cl. .............................. 144/144.5 R; 33/564; 144/137; 269/49; 269/53; 269/189; 269/240
[58] Field of Search ................. 33/197, 562, 563, 564, 33/565; 269/49, 53, 54.1, 54.2, 54.3, 189, 240, 244, 256; 144/137, 144.5

[56] References Cited

U.S. PATENT DOCUMENTS

| 142,470 | 9/1873 | Hunt | 269/189 |
|---|---|---|---|
| 893,009 | 7/1908 | Niday | 269/240 |
| 2,170,535 | 8/1939 | Marsden | 269/49 |
| 2,648,248 | 8/1953 | Cederquist . | |
| 2,747,638 | 5/1956 | Cederquist . | |
| 2,778,087 | 1/1957 | Krueper et al. | 269/49 |
| 3,150,452 | 9/1964 | Meuwissen | 144/144.5 |
| 4,236,703 | 12/1980 | Stevenson | 269/53 |
| 4,274,459 | 6/1981 | Galajda | 33/564 |
| 4,553,336 | 11/1985 | Ponce | 144/144.5 |
| 4,837,939 | 6/1989 | Pullen | 33/562 |

OTHER PUBLICATIONS

Knape & Vogt Manufacturing Company, Grand Rapids, Mich. 49505; "KV No. 516 Tite–Joint Fasteners", 2 Pages.
Häfele-Minifix 15 Knock Down Fittings; TRACI-K Inc., 201 NE 33 Street, Fort Lauderdale, Fla. 33334 (Connectors), 1 Page.

Primary Examiner—W. Donald Bray
Attorney, Agent, or Firm—Herbert L. Lerner; Laurence A. Greenberg

[57] ABSTRACT

A clamping assembly with at least two clamping members with inner surfaces facing towards each other and outer surfaces facing away from each other, a bolt passes through holes formed in the clamping members, the bolt including a bolt head and a threaded section, the inner surfaces including means for gripping work surface, such that when the bolt is tightened, work pieces are clamped together.

8 Claims, 1 Drawing Sheet

CLAMPING ASSEMBLY

BACKGROUND OF THE INVENTION

1. Field of the Invention

The invention relates to a clamping assembly and kit for interconnecting two workpieces with abutting edges.

2. Description of the Related Art

A variety of assemblies and devices have been provided through the years attempting to answer the industry demands for devices which enable quick and secure connection between abutting workpieces.

Such an assembly is disclosed, for instance, in U.S. Pat. No. 2,747,638 to Cederquist. Commercially available as "Tite-Joint Fastener", a registered U.S. trademark, this device comes complete with a bolt, a tightening nut, a locking sleeve and a drill-guide. One vertical recess is drilled in each respective workpiece for receiving the nut and the sleeve, and one hole for the bolt is horizontally bored from the respective edge surfaces of each of the workpieces to the recesses. The individual parts of the assembly are then inserted in a certain sequence, namely the tightening nut is inserted first, then the bolt is threaded into the tightening nut, and then the locking sleeve is placed on top of the bolt.

One of the major disadvantages of this assembly is the fact that at least the horizontal holes can only be drilled when the two workpieces are spaced apart, and the bolt must be inserted prior to abutting the workpieces. Furthermore, this assembly is rather disadvantageous for use in hard-to-reach locations, and in particular with the work surface facing downward. This is because nothing prevents the tightening nut and the locking sleeve from slipping out of the holes before they are tightened.

Other devices are also known. All of them, however, are subject to these types of disadvantages. In particular, none of them appear to address the problem of severely restricted space in the field of cabinet installations and the like and working environments in hard-to-reach locations.

Particularly in the assembly and installation of counters and cabinets it is important to ensure quick, secure, easy-to-install and permanent connections at abutting seams between the workpieces. This is not provided in the prior art.

SUMMARY OF THE INVENTION

It is accordingly an object of the invention to provide a clamping assembly which overcomes the hereinafore-mentioned disadvantages of the heretofore-known devices of this general type, which allows quick and secure connection between abutting workpieces, especially in hard-to-reach places, and which allows reinforcement of already connected workpieces.

With the foregoing and other objects in view there is provided, in accordance with the invention, a clamping assembly comprising at least two clamping members with inner surfaces facing towards each other, disposed at the inner surfaces gripping a work surface and outer surfaces facing away from each other, and a bolt passing through holes formed in the clamping members, the bolt including a bolt head and a threaded section.

In accordance with further features of the invention, the means for gripping a work surface are in the form of a ridge extending substantially across the length of the inner surfaces, a multiplicity of protrusions, or at least two protrusions at opposite ends of the inner surfaces. When these means engage in the work surface, the clamping members are prevented from rotating and from falling out of the recesses cut into the workpieces.

With the objects of the invention in view there is also provided a jig for cutting recesses in surfaces of two abutting workpieces to be connected together along a separating line; the jig comprises a jig body having two substantially D-shaped cutouts formed therein defining substantially semi-circular edges and substantially flat edges of the jig body at the D-shaped cutouts, the flat edges having a given length, and the jig body having an elongated cutout formed therein interconnecting the flat edges, the elongated cutout having a width being less than the given length.

Accordingly, after the jig is removed following the routing operation, a recess is left in the workpieces defining flat edges which are oriented substantially parallel to the abutting seam between the workpieces and defining an elongated bridging section for receiving the bolt of the clamping assembly.

With the objects of the invention in view, there is further provided a kit which combines the jig and the clamping assembly.

Other features which are considered as characteristic for the invention are set forth in the appended claims.

Although the invention is illustrated and described herein as embodied in a clamping assembly, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiments when read in connection with the accompanying drawings.

DESCRIPTION OF THE PREFERRED EMBODIMENTS

Figure 1:
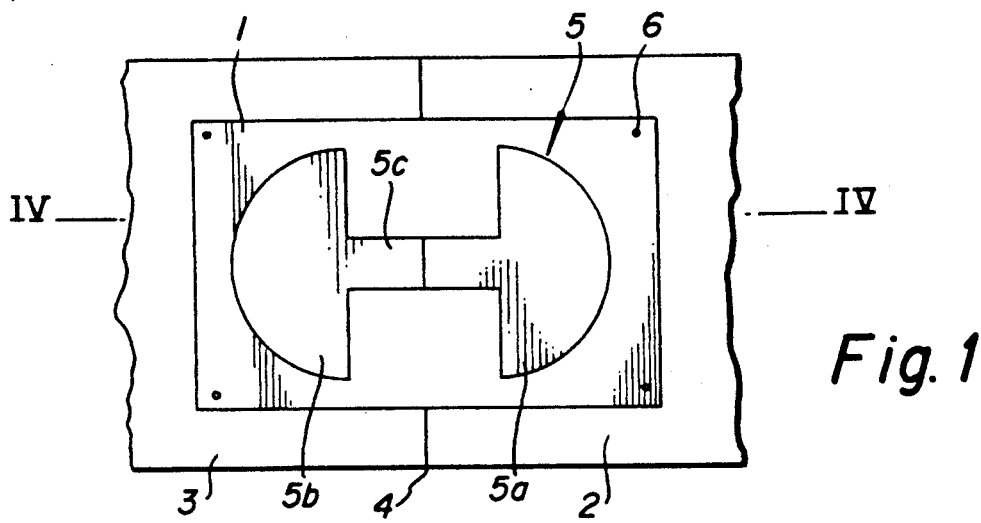
FIG. 1 is a fragmentary, diagrammatic, bottom-plan view of the rear surfaces of two workpieces which are placed in a tightly abutting position and are to be cut out with a jig that is held in place and interconnected by means of the clamping assembly in accordance with the invention.

Referring now to the figures of the drawing in detail and, in particular, to FIG. 1 thereof, there is seen a jig or template 1 which is placed on workpieces 2 and 3 to be joined together. The jig 1 may be made of plexiglass, aluminum, or any material of comparable hardness and elasticity. The jig 1 shown is rectangular in shape and its longitudinal axis is positioned perpendicular to a butt seam or separating line 4 between the workpieces 2 and 3.

The jig 1 has a cutout section 5 located in its center. The shape of the cutout section 5 may be described as two D-shaped cutouts or halfmoons 5a and 5b mutually facing each other, with their flat edges or surfaces spaced apart and connected by an elongated cutout or narrow bridging section 5c and their semi-circular edges facing away from each other. The jig 1 also features several screw or nail holes 6 for temporarily fastening the jig 1 to the workpieces 2 and 3. The screw holes 6 illustrated in FIG. 1 are located in the vicinity of the corners of the jig 1 but may be located in any strategically advantageous position on the jig 1.

After the jig 1 is placed on the workpieces 2 and 3, the surface area of the workpieces 2, 3 showing through the cutout section 5 is milled out or cut out. This is usually done by means of a router. Obviously, this must be done with some care, so that the routed hole will not extend to the opposite surface of the workpieces 2 and 3. The routing depth depends on the thickness of the workpieces, and a minimum depth is required depending on the size of the clamp used.

After the workpieces 2 and 3 have been worked on with the router, the jig is again removed leaving a cutout, the form of which matches the cutout section 5 of the jig 1.

Figure 2:
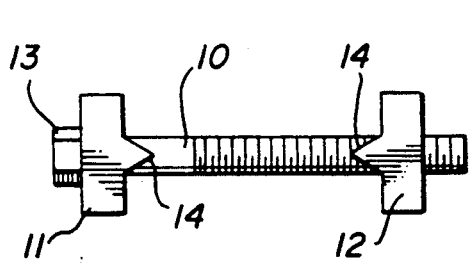
FIG. 2 is a side-elevational view of the clamping assembly in accordance with the invention.

As shown in FIG. 2, the clamp includes a bolt 10 and two clamping members 11 and 12. The bolt 10 as shown is equipped with a hexhead 13, i e. a hexagonally shaped head section of standard size for accommodating a wrench or similar tightening tool thereon. As an alternative, the bolt head 13 may also have holes disposed in it perpendicular to the longitudinal axis of the bolt 10. The size of these holes would be in the order of the outer diameter of an average-sized nail, or approximately 2 to 3 mm in diameter. The bolt 10 may then be tightened with a simple nail or an appropriate tightening tool.

The body of the bolt 10 includes a smooth section adjacent the head 13 and a threaded section at the distal end. The first clamping member 11 is slipped onto the bolt 10, with a gripper ridge or lip 14 facing away from the head 13, toward the threaded section of the bolt 10. The second clamping member 12 is threaded onto the bolt 10 with its ridge 14 facing toward the first clamping member 11. When the bolt is rotated while the clamping member 12 is not allowed to rotate, the distance between the members 11 and 12 will either decrease or increase, depending on the direction of rotation.

Figure 3:
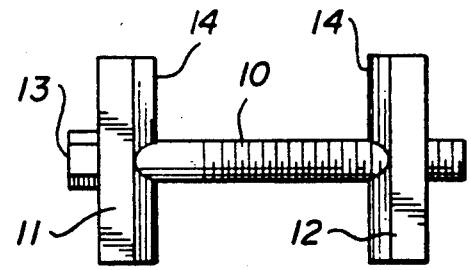
FIG. 3 is an enlarged top-plan view of the clamping assembly in accordance with the invention, as rotated by 90° about the bolt axis with respect to FIG. 2.

After both of the members 11 and 12 are threaded and slipped onto the bolt 10 as shown in FIGS. 2 and 3, this assembly is placed in the recess milled or cut out of the workpiece surface in accordance with the cutout 5 of the jig 1. Logically, the distance between the ridges 14 of the respective clamping members 11 and 12 will be just slightly larger than the length of the center section 5c. The member 11 with the bolt head 13 is placed in the recess section 5b, the center section of the bolt 10 fits into the recess section or elongated cutout 5c, and the clamping member 12 on the threaded section of the bolt 10 is placed in the recess section or D-shaped cutout 5a.

After the clamp is placed in the recess 5, a torque is applied to the head of the bolt 10 such that the second clamping member 12 is pulled closer towards the first clamping member 11. The two members 11 and 12 are thus pulled together, so that they will touch and engage in the respective surfaces defined by the flat edges of the halfmoons 5a and 5b.

Figure 4:
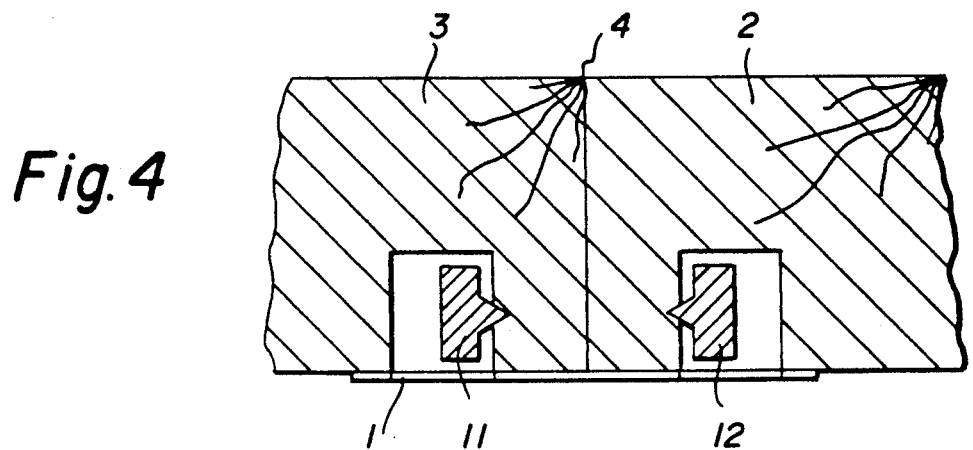
FIG. 4 is a longitudinal-sectional view taken along the line IV—IV in FIG. 1, with the clamping members of the clamping assembly shown in an engaged position.

As can be seen in FIG. 4, the ridges 14 of the respective clamping members 11 and 12 engage and cut into the workpieces 2 and 3 respectively. This prevents the members 11 and 12 from turning. This torsion lock is extremely important in hard-to-reach locations. Furthermore, this gripping or cutting into the workpieces 2 and 3 also prevents the clamping assembly from falling out, which is also advantageous, since in many installation situations the clamping assembly is used on the lower surface of the workpieces 2 and 3.

Figure 5A:
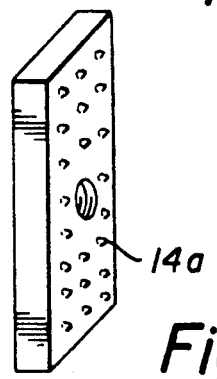
FIG. 5a is a further enlarged perspective view of a second embodiment of a clamping member.

As shown in FIG. 5a, the gripper surfaces of the clamping members 11 and 12 may be formed of a multitude of protrusions 14a. After inserting the clamping assembly into the recess 5 as described above, a slight pressure on the back of the clamping member 11 will in fact attach it to the work surface defined by the face of the halfmoon 5b, since in most applications the workpiece material is wood or a material of comparable hardness.

Figure 5B:
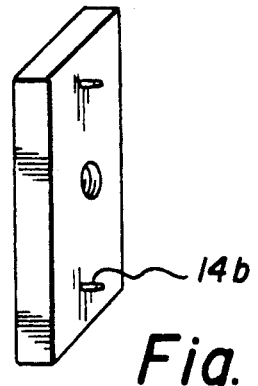
FIG. 5b is a perspective view of a third embodiment of a clamping member.

This is also true for the gripper surface shown in FIG. 5b, wherein two points 14b similar to the tip section of a nail, protrude from the gripper surface. Pressure exerted on the back of the member 11 with one or two fingers will already fixedly hold the assembly in position, since the points 14b will readily engage in the work surface defined by the flat edges of the cutout sections 5a and 5b. Subsequent tightening of the bolt 10 is made much easier, requiring only one hand to work in often hard-to-reach positions.

We claim:

1. A clamping assembly for connecting abutting workpieces having recesses formed therein defining work surfaces, comprising two clamping members being movable toward each other along a given longitudinal axis, said clamping members having inner surfaces facing each other with means for gripping the work surfaces, a bolt including a threaded section and a bolt head to be rotated by a tool, said bolt extending along the longitudinal axis through a hole formed in one of said clamping members and said threaded section being screwed into a threaded hole formed in the other of said clamping members, each of said clamping members being disposed in a respective one of the recesses and at least one of said clamping members being smaller than a corresponding one of the recesses permitting rotation of said bolt head by the tool for drawing the work surfaces towards each other along the given longitudinal axis.

2. The clamping assembly according to claim 1, wherein said means are in the form of a ridge extending substantially across the length of said inner surfaces.

3. The clamping assembly according to claim 1, wherein said means are in the form of a multiplicity of protrusions for engaging in a work surface.

4. The clamping assembly according to claim 1, wherein said means are in the form of at least two protrusions disposed at opposite ends of said inner surfaces.

5. A jig for cutting recesses in surfaces of two abutting workpieces to be connected together along a separating line, comprising a jig body having two substantially D-shaped cutouts formed therein defining substantially semi-circular edges and substantially flat edges of the jig body at said D-shaped cutouts, said flat edges having a given length, and said jig body having an elongated cutout formed therein interconnecting said flat edges, said elongated cutout having a width being less than said given length.

6. Kit for interconnecting two work-pieces, comprising a jig for cutting recesses in surfaces of two abutting workpieces to be connected together along a separating line, said jig including a jig body having two substantially D-shaped cutouts formed therein defining substantially semi-circular edges and substantially flat edges of the jig body at said D-shaped cutouts, said flat edges having a given length, and said jig body having an elongated cutout formed therein interconnecting said flat edges, said elongated cutout having a width being less than said given length; and a clamping assembly including at least two clamping members with inner surfaces facing towards each other and outer surfaces facing away from each other, a bolt passing through holes formed in said clamping members, said bolt including a bolt head and a threaded section, and said inner surfaces including means for gripping the work surface when said clamping assembly is placed in the recesses cut into the workpieces, with said clamping members fitting into the recesses defined by said D-shaped cutouts and said bolt fitting into the recess defined by said elongated cutout.

7. A combination, comprising abutting workpieces having recesses formed therein defining work surfaces, and a clamping assembly for connecting said abutting workpieces, said clamping assembly including two clamping members being movable toward each other along a given longitudinal axis, said clamping members having inner surfaces facing each other with means for gripping the work surfaces, a bolt including a threaded section and a bolt head to be rotated by a tool, said bolt extending along the longitudinal axis through a hole formed in one of said clamping members and said threaded section being screwed into a threaded hole formed in the other of said clamping members, each of said clamping members being disposed in a respective one of said recesses and at least one of said clamping members being smaller than a corresponding one of said recesses permitting rotation of said bolt head by the tool for drawing said work surfaces towards each other along the given longitudinal axis.

8. The clamping assembly according to claim 1, wherein said bolt head has a shape for receiving a wrench.

* * * * *